July 2, 1963  D. R. CRAIG  3,096,176
PHOTOGRAPHIC PRINTING METHOD
Filed March 13, 1957

INVENTOR
DWIN R. CRAIG
BY Raymond W. Cotton
ATTORNEY

United States Patent Office 3,096,176
Patented July 2, 1963

3,096,176
PHOTOGRAPHIC PRINTING METHOD
Dwin R. Craig, Falls Church, Va., assignor to Logetronics, Inc., Alexandria, Va., a corporation of Delaware
Filed Mar. 13, 1957, Ser. No. 645,717
8 Claims. (Cl. 96—27)

This invention relates to a photographic method and particularly to a method of exposing a photosensitive emulsion having a fixed exposure scale in the reproduction of images of varying density scales. Best results are achieved in photographic printing when the density scale of the negative exactly matches the exposure scale of the photosensitive surface on which the print is to be made. An assortment of negatives will invariably possess a wide range of density scales, depending not only on the original scene and its illumination, but also on the many parameters in the photographic process itself, such as lens flare, light scatter within the camera, characteristics of the film, and subsequent processing of the film.

In accordance with present practice, there are several ways in which the photographer can cause his final print to exhibit an acceptable range of densities. These techniques include the selection of graded contrast photographic papers to suit the given negative, manipulation of exposure and development to give the desired contrast response of the photographic emulsion, and the use of paper whose variable contrast depends upon the color of the exposing light. Each of these methods requires that the photographic material on which the print is to be made be chosen to match the negative, and in each case only the density scale can be accurately forecast, requiring the desired absolute densities to be obtained by manipulating the time of exposure. With so many variables to be controlled, these techniques possess many shortcomings which have long been known to those engaged in the art.

It is among the objects of the present invention to make it possible to obtain absolute, end-point, maximum and minimum print densities and to effectively eliminate many of the variables which must be considered by conventional techniques of contrast control. This invention renders possible the reproduction of all negatives on a single type of printing material, followed by a single standardized development procedure. Among other advantages, conventional printing materials and processing techniques may be used.

The functions of both contrast and density control may be performed exclusively in the exposing operation by adjusting the projected image of the negative to match a known standard printing material, as distinguished from the common expedient of selecting or adjusting the printing material to accommodate the characteristics of the negative. The invention contemplates a method for measuring and properly varying the brightness and contrast characteristics of the projected image to insure a match between the image characteristics and those of the photosensitive surface of the printing material. A relatively high contrast (short exposure scale) printing material will be used in order that image contrast can be optically reduced to match it.

The photographic printing method contemplated by the present invention comprises directing light from a source to an object and projecting an image of the object on a surface, measuring the maximum brightness of the image at the surface, adjusting the overall brightness of the image until the maximum brightness equals a first fixed predetermined value, superimposing light of uniform intensity over the surface, adjusting the brightness of the light of uniform intensity until the minimum aggregate brightness of light at the surface equals a second fixed predetermined value, then exposing a film of photosensitive emulsion to the aggregate light at the surface and developing the film. The first and second fixed predetermined values will equal the end-points of exposure respectively, of the photosensitive emulsion having a fixed predetermined exposure scale and whose exposure time can be constant. The surface at which the measurements are made and on which the light is projected is preferably a plane. The light of uniform intensity superimposed on the image light may be produced by a separate auxiliary light source, in which case, particularly for color work, the multiple light sources will possess similar color characteristics.

A more complete understanding of the invention will follow from a description of the accompanying drawings wherein.

Figure 1:
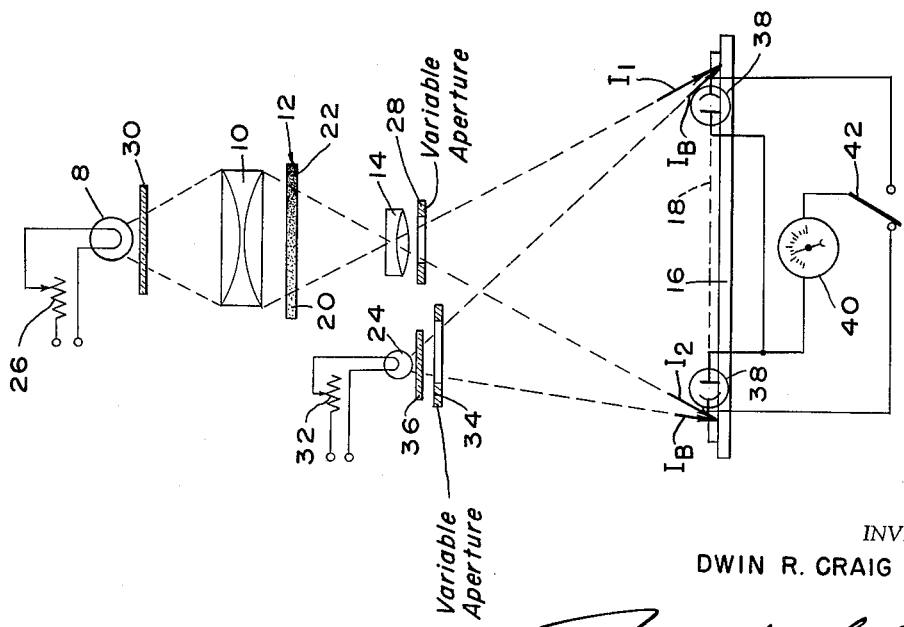
FIG. 1 is a schematic view depicting an application of the invention.

The method of reducing the contrast of a projected image can best be understood by referring to FIG. 1 of the drawings depicting a source 8 directing light through a condensing lens 10, a negative 12, and a lens 14 towards an easel 16 whose upper surface is adapted to support a photosensitized body of printing material 18. The light passing through the thinnest portion 20 of the negative (corresponding to extreme shadow in the original scene) is received at the easel at an intensity value denoted $I_1$. The light passing through the densest portion 22 of the negative (corresponding to extreme highlight in the original scene) is projected onto the easel at an intensity value denoted $I_2$. The contrast of the negative is usually expressed by the ratio $I_1:I_2$. Since the present invention contemplates that this ratio will always exceed the exposure scale of the photosensitive printing material to be used, in order to effect an exact match, it is necessary to reduce the value of this $I_1:I_2$ ratio. This reduction is achieved by superimposing on the image formed on the easel, a beam of light of uniform intensity, from the same light source or from a separate source, which will reduce the image contrast to which the printing material is exposed, in a manner similar to that in which images viewed by the eye or a camera through a haze are reduced in contrast.

The effect of such superimposed light from an auxiliary source 24, which produces a uniform intensity $I_B$ at the easel, is represented by the equation:

$$\frac{I_S}{I_H} = \frac{I_1 + I_B}{I_2 + I_B}$$

where $I_S$ is the image intensity which will represent the shadow area in the final print, and $I_H$ is the image intensity which will represent the highlight area in the final print. From this equation it will be evident that the presence of the auxiliary light $I_B$, which does not pass through the negative, will reduce the contrast in the printed image below that which would occur without such light.

Through the selected thin and dense portions of the negative, according to this invention, the sum of the image forming light and the auxiliary light will be a constant. Accordingly, the adjusted image intensity representing the shadow area will be expressed by $$I_S = I_1 + I_B$$

and the adjusted image intensity representing the highlight area will be expressed by $$I_H = I_2 + I_B$$

Then, if T represents a fixed exposure time, since exposure is expressed as the product of intensity and time, $$(I_1+I_B)T=I_ST$$

and $$(I_2+I_B)T=I_HT$$

Figure 2:
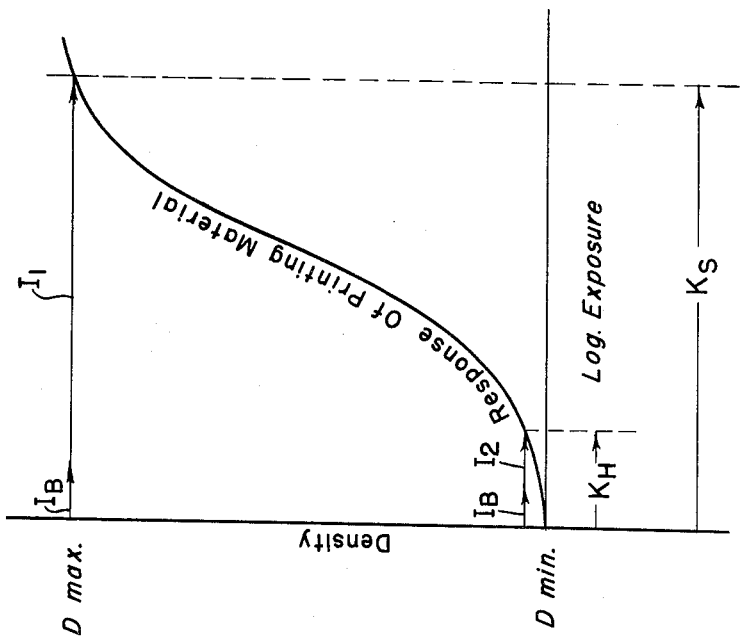
FIG. 2 is a curve depicting relationships of values employed.

Since the value of $I_ST$ is a constant, it can be expressed as $K_S$, and similarly, since the value of $I_HT$ is a constant, it can be expressed as $K_H$. These values denote the endpoints of exposure for the photosensitive printing material to be used, and indicate in FIG. 2 of the drawing the maximum and minimum exposures which will produce maximum and minimum print densities with printed material having the characteristic curve shown.

Thus it will appear that means must be provided for varying the brightness of the projected image, and for varying the brightness of the auxiliary light superimposed upon the projected image. Brightness of the projected image can be controlled by varying the intensity of the light source by means of a variable resistor 26, for example; by varying the size of an aperture 28 in the optical path of the image forming light; and/or by interposing one or more filters 30 in the optical path. Similarly, the intensity of light coming from the auxiliary source can be modified by a variable resistor 32, a variable aperture 34, and/or a filter 36. After such appropriate means for controlling intensities are incorporated into the apparatus, it is necessary to select two points within the projected image which represent the extreme shadow and the extreme highlight in the original scene, and then measure the light intensity at the easel 16 corresponding thereto. The measuring device may be a conventional photometer, such as an electronic photometer, schematically depicted in FIG. 1 as comprising one or more photosensitive cells 38 connected in circuit with a meter 40 by means of a switch 42. It is important to note that the brightness measurements are made in the same apparatus with which the actual exposure will be performed and that the brightness measurements are made in the plane to be occupied by the photosensitive emulsion carried by the printing material. The brightness measurements should be made through filters, such as filters 30 and 36, which transmit only that part of the spectrum to which the photographic emulsion carried by the printing material is sensitive.

Assuming that only one photometer is used, the measurement and control procedure might be as follows: (1) Place the photometer in the plane of the projected image at the point of maximum image brightness; (2) with $I_B$ at zero, adjust the image brightness to the predetermined value of $K_S$ which can be read directly from a properly calibrated photometer scale; (3) move the photometer in the plane of the projected image to the position of minimum brightness where it will be found that $I_2$ is less than the desired value $K_H$; (4) increase the intensity of light from the auxiliary source 24 until the sum of $I_2$ plus $I_B$ produces a photometer reading corresponding to the predetermined value of $K_H$. (Since it will be found that the addition of $I_B$ will contribute very little to the area of high brightness ($I_1$), no readjustment of $I_S$ will be required); (5) place the printing material on the easel and expose it for the predetermined fixed time (T).

Thus, by way of summary, according to the present invention, the method of contrast control requires only a single photographic material (any standard high contrast emulsion on paper, film, or glass) and involves procedures which can be followed readily by those familiar with standard developing practice; all measurements are made in the plane of the projected image which the emulsion to be exposed will ultimately occupy; and a fixed exposure time can be used for all negatives with the assurance that maximum and minimum print densities will correspond to maximum and minimum negative densities, and that the desired absolute values for maximum and minimum print density will be obtained.

It is well known that atmospheric haze between a subject and a camera will reduce image contrast, and similar effects are produced by light scattering or flare within the camera. Under these conditions, contrast of detail will suffer a greater reduction within shadow areas than it will within highlight areas. The net effect is a nonlinear reproduction of the original scene due to the addition of haze to the positive image. The method of contrast control described herein reduces contrast of the projected image by adding "haze" to the negative image which is equivalent to subtracting haze from the positive image (in terms of the resulting non-linearities in tone reproduction) tending to compensate for the initial haze conditions. Accordingly, reproductions made by the present technique will more nearly duplicate the actual scene than will conventional printing.

The present invention is by no means limited to photographic printing in an enlarger, but is equally applicable to contact printing, certain types of initial photography, and other forms of reproduction; nor is it limited to reproduction in black and white since color reproduction is definitely contemplated, and in both cases applies to both negative/positive as well as reversal materials. It is especially important in color reproduction that light from separate sources have similar color characteristics. In other words, the spectral distribution of light from said sources and the spectral sensitivity of said emulsion include common ranges of wavelength. Color correction (in making color separations) can be simply introduced by using different pairs of values for K for the different colors being recorded. Hence, the single example of the invention shown and described should not be construed as limiting the invention beyond the scope of the appended claims.

I claim:

1. A photographic printing method comprising directing light from a source to an object and projetcing an image of said object on a surface, positioning brightness indicating devices at points approximating respectively the minimum and the maximum brightness of said image at said surface, adjusting the overall brightness of said image until the maximum brightness indicating device indicates a first fixed predetermined value, superimposing light of uniform intensity over said surface, adjusting the brightness of said light of uniform intensity until the minimum brightness indicating device indicates a second fixed predetermined value, then exposing a film of photosensitive emulsion to the aggregate light at said surface and developing said film.

2. A photographic method as set forth in claim 1 wherein said image brightness and said superimposed uniform brightness are adjusted to satisfy simultaneously the following equation:

$$(I_1+I_B)T=K_S$$

and $$(I_2+I_B)T=K_H$$

where $I_1$=maximum image brightness,
$I_2$=minimum image brightness,
$I_B$=brightness of uniformly superimposed light,
$T$=predetermined time of exposure,
$K_S$=exposure required to produce maximum density of the exposed and developed emulsion, and
$K_H$=exposure required to produce minimum density of the exposed and developed emulsion.

3. A photographic printing method as set forth in claim 1 wherein said first and second fixed predetermined values equal the values of exposure respectively which will produce minimum and maximum density of said photosensitive emulsion after developing said film.

4. A photographic printing method as set forth in claim 1 wherein said surface is a plane.

5. A photographic printing method as set forth in claim 1 wherein said film is exposed to said aggregate light for a fixed predetermined time independent of the object.

6. A photographic printing method as set forth in claim 1 wherein said light of uniform intensity is produced by a separate light source.

7. A photographic printing method as set forth in claim 6 wherein the spectral distribution of light from said sources and the spectral sensitivity of said emulsion include common ranges of wavelength.

8. A photographic printing method as set forth in claim 1 wherein said object is a transparency and said image is formed by light transmitted through said transparency.

References Cited in the file of this patent
UNITED STATES PATENTS

| | | |
|---|---|---|
| 1,840,351 | Douden | Jan. 12, 1932 |
| 2,149,250 | Bing | Mar. 7, 1939 |
| 2,352,914 | Rackett | July 4, 1944 |
| 2,571,697 | Evans | Oct. 16, 1951 |
| 2,853,921 | Biedermann et al. | Sept. 30, 1958 |

OTHER REFERENCES

Photography Directory, Ziff-Davis Publ. Co., New York, 1956, page 122.

Tory: Photolithography, publ. Graphic Arts Monthly, Chicago, July 1953, page 77.